United States Patent [19]
Ito et al.

[11] Patent Number: 5,955,117
[45] Date of Patent: *Sep. 21, 1999

[54] INJECTION MECHANISM OF AN INJECTION MOLDING MACHINE

[75] Inventors: Susumu Ito; Koichi Nishimura, both of Oshino-mura, Japan

[73] Assignee: Fanuc Ltd., Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/702,664
[22] PCT Filed: Jan. 18, 1996
[86] PCT No.: PCT/JP96/00070
  § 371 Date: Sep. 10, 1996
  § 102(e) Date: Sep. 10, 1996
[87] PCT Pub. No.: WO96/22183
  PCT Pub. Date: Jul. 25, 1996

[30] Foreign Application Priority Data

Jan. 19, 1995 [JP] Japan .................................. 7-023333

[51] Int. Cl.$^6$ .................................................. B29C 45/77
[52] U.S. Cl. ......................... 425/145; 425/149; 425/593
[58] Field of Search .................................... 425/149, 145, 425/593

[56] References Cited

U.S. PATENT DOCUMENTS

| | | | |
|---|---|---|---|
| 4,938,682 | 7/1990 | Kadoriku et al. | 425/593 |
| 5,129,808 | 7/1992 | Watanabe et al. | 425/145 |
| 5,206,034 | 4/1993 | Yamazaki | 425/149 |
| 5,209,936 | 5/1993 | Ihara et al. | 425/149 |
| 5,380,181 | 1/1995 | Hiraoka et al. | 425/145 |
| 5,421,712 | 6/1995 | Laing et al. | |

FOREIGN PATENT DOCUMENTS

| | | |
|---|---|---|
| 63-077721 | 4/1988 | Japan . |
| 63-077722 | 4/1988 | Japan . |
| 63-078719 | 4/1988 | Japan . |
| 64-27921 | 1/1989 | Japan . |
| 2-16023 | 1/1990 | Japan . |
| 2-38018 | 2/1990 | Japan . |
| 2-63713 | 3/1990 | Japan . |
| 5-24083 | 2/1993 | Japan . |
| 05084798 | 4/1993 | Japan . |

*Primary Examiner*—Tim Heitbrink
*Attorney, Agent, or Firm*—Staas & Halsey, LLP

[57] ABSTRACT

The tip of a ball screw (28) is mounted so as to be rotatable with respect to a pusher plate (14) but immovable in the axial direction. A ball nut (31), which mates with the ball screw (28), is attached to a rear plate (2) through a load cell (33). Even though a force in the rotating direction is applied to the ball nut (31) through friction as the ball screw (28) rotates, the applied force never acts as a force to rotate the pusher plate (14). Thus, the level of sliding resistances between the pusher plate (14) and guide rods has nothing to do with the magnitude of the rotatory force of the ball screw, so that resin pressure components can accurately be extracted from the output of the load cell (33).

15 Claims, 6 Drawing Sheets

INJECTION MECHANISM OF AN INJECTION MOLDING MACHINE

TECHNICAL FIELD

The present invention relates to an improvement of an injection mechanism of an injection molding machine.

BACKGROUND ART

In general, the construction of motor-driven injection molding machine broadly comprises a mold clamping mechanism A and an injection mechanism B, as shown in FIG. 6.

The mold clamping mechanism A is composed of a movable platen 95 having a movable mold half MM fixed thereto, a stationary platen 96 having a stationary mold half SM fixed thereto, a rear platen 97, a toggle mechanism 98 for moving the movable platen 95 toward or away from the stationary platen 96 to effect mold clamping or opening, a mold clamping motor 99 for actuating the toggle mechanism 98, etc.

The injection mechanism B is composed of an injection screw 5 and an injection cylinder 2 for injecting a molten resin into a cavity of a mold, which is formed of the movable mold half MM and the stationary mold half SM clamped together, and metering it, a motor 36 for injection as a drive source for advancing the injection screw 5 with respect to the injection cylinder 2 to effect injection, a motor 35 for screw rotation as a drive source for rotating the injection screw 5 in the injection cylinder 2 to effect metering and kneading, etc. The rotation of the motor 36 for injection is transmitted to a ball screw 10 through a pulley 13, and the rotation of this ball screw 10 is converted into a force to press a pusher plate 6 by means of a ball nut 9. Thereupon, the pusher plate 6, guided by guide rods 4, moves straight, so that the screw 5 is actuated for translation. On the other hand, the rotation of the motor 35 for screw rotation is transmitted to the screw 5 through a pulley 20, to drive the screw.

In FIG. 6, symbol BS designates a base. While the mold clamping mechanism A is fixed to the base BS, the whole injection mechanism B is allowed to move toward or away from the mold clamping mechanism A so that the distal end (nozzle) of the injection cylinder 2 can be made either to come into contact or move away from the mold.

Referring now to FIG. 5, the injection mechanism B will be described in detail. A front plate 1 and a rear plate 3 are fixed integrally to each other by means of the guide rods 4, which serve also as tie rods. The injection cylinder 2 is fixed to the front plate 1. The injection screw 5 is attached to the pusher plate 6 so as to be rotatable and immovable in the axial direction. This pusher plate 6 is slidably mounted on the guide rods 4 through bushings 7.

The ball nut 9 is fixed to the side face of the pusher plate 6 which faces the rear plate 3 through a load cell 8, which detects detecting a resin reaction force, so as to be rotatable with respect to the pusher plate 6 but immovable in the injection-axis direction (i.e., axial direction of the injection screw). The ball nut 9 mates with the ball screw 10 that is attached to the side of the rear plate 3 so as to be rotatable and immovable in the axial direction. The ball screw 10 is supported by means of three angular bearings 11, 11 and 12 so as to be rotatable with respect to the rear plate 3 and immovable in the axial direction. Inner and outer rings of each of the bearings 11, 11 and 12 are fixed, respectively, to the outer periphery of the ball screw 10 and the inner periphery of a through hole that is formed in the center of the rear plate 3. Among these bearings, each of the two angular bearings 11 includes an inner ring and an outer ring for supporting a resin reaction force that acts on the inner ring from forward. Also, the angular bearing 12 includes an inner ring and an outer ring for supporting a force that acts on the inner ring from behind.

The axis of the ball screw 10 is in line with the axis of the injection screw 5. In the description to follow, therefore, this common axis will be referred to as an "injection axis."

The pulley 13 for injection is fixed to the end portion of the ball screw 10 which projects rearward from the rear plate 3. When the rotatory force of the motor for injection (not shown), which is fixed in the vicinity of the rear plate 3, is transmitted to the pulley 13, the ball screw 10 rotates to drive the ball nut 9 for feeding. The driven ball nut 9 presses the pusher plate 6 through the load cell 9, thereby moving the injection screw 5 in the axial direction.

As this is done, a frictional force between the ball screw 10 and the ball nut 9 is transmitted to the pusher plate 6 through the ball nut 9 and the load cell 8, causing a force to act so as to rotate the pusher plate 6 around the injection axis. As a result, the bushings 7 in the pusher plate 6 engage only one side of the guide rods 4 so that sliding resistances are generated between the pusher plate 6 and the guide rods 4.

Since the load cell 8 detects the force of pressure of the pusher plate 6, which slides on the guide rods 4, on the ball screw 10, it detects the sum of the substantial resin reaction force that acts on the tip of the injection screw 5 and the sliding resistances between the pusher plate 6 and the guide rods 4. The sliding resistances between the pusher plate 6 and the guide rods 4 cannot take a constant value, as it varies depending on the magnitude of the rotatory force of the ball screw 10. It is difficult, therefore, to accurately extract only the resin reaction force that acts on the tip of the injection screw 5 by simply subtracting a sliding resistance component from the detection output of the load cell 8.

DISCLOSURE OF THE INVENTION

The object of the present invention is to provide an injection mechanism of an injection molding machine, which is designed so that a pusher plate of an injection screw is slidably supported by means of guide rods, and the level of sliding resistances acting between the pusher plate and the guide rods can always be kept at a fixed value, whereby only a resin reaction force that acts on the injection screw can be extracted accurately by means of a load cell, and the aforementioned drawback of the prior art can be eliminated.

According to the present invention, there is provided an injection mechanism of an injection molding machine, which comprises: an assembly including a plurality of parallel guide rods, a front plate and a rear plate fixed individually to the opposite ends of the guide rods, and a pusher plate movable between the front and rear plates by being guided with the guide rods, the pusher plate supporting the rear end portion of an injection screw so as to be rotatable with respect to the pusher plate and engaging the tip of a ball screw; a load cell fixed to part of a member constituting the assembly; a ball nut fixed to the load cell and mating with the ball screw; a drive source and rotation transmitting means for rotating the injection screw; and a drive source and rotation transmitting means for rotating the ball screw to move the ball screw in the axial direction with respect to the ball nut, in which the engagement of the ball screw with the pusher plate is based on an arrangement such that the ball screw engages the pusher plate so as to be rotatable with respect to the pusher plate and immovable in the axial direction, and moreover, the load cell is fixed to the rear plate constituting the assembly, whereby the ball nut is fixed to the rear plate through the load cell.

According to the present invention, as described above, the tip of the ball screw is attached to the pusher plate so as to be rotatable with respect to the pusher plate and immovable in the axial direction, and the ball nut, which mates with the ball screw, is designed so as to be attached to the rear plate, not to the pusher plate, through the load cell. Thus, even though a force in the rotating direction is applied to the ball nut through friction between the ball screw and the ball nut as the ball screw rotates, it will never act as a force to rotate the pusher plate. As a result, the level of sliding resistances generated between the pusher plate and the guide rods for its sliding motion continues to take a substantially constant value during a molding process regardless of the rotation of the ball screw. Thus, a resin pressure component can be accurately obtained by eliminating a sliding resistance component for correction from the output value of the load cell, which detects the sum of the resin pressure on the screw tip and the sliding resistances.

BEST MOST OF CARRYING OUT THE INVENTION

Figure 1:
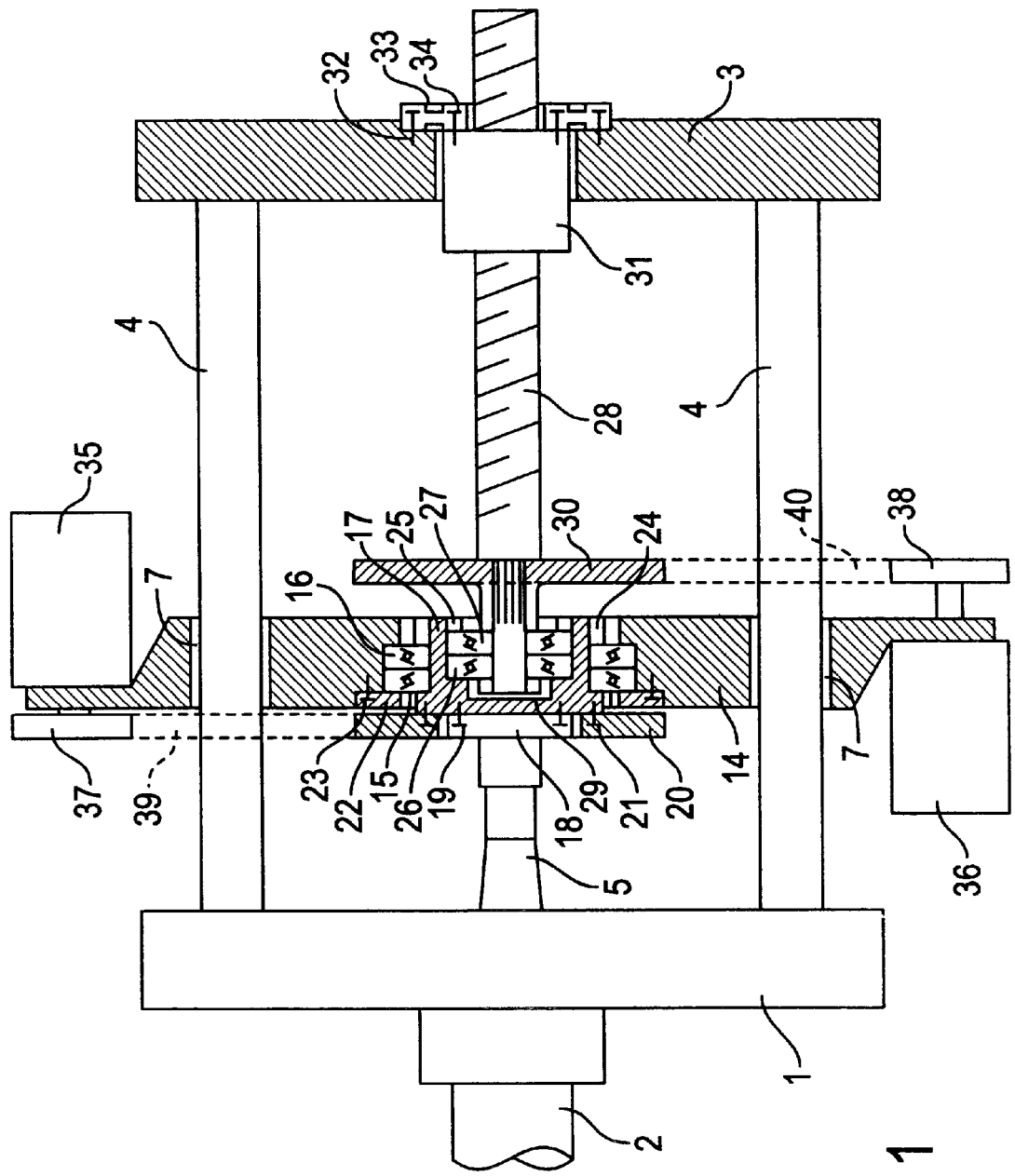
FIG. 1 is a side view, partially in section, showing an outline of a first embodiment of an injection mechanism of an injection molding machine according to the present invention.

Referring first to FIG. 1, a first embodiment of the present invention will be described. A front plate 1 and a rear plate 3 are fixed integrally to each other by means of guide rods 4, which serve also as tie rods. A pusher plate 14 is slidably mounted on the guide rods 4 through bushings 7.

A screw sleeve 17 is fixed to a screw mounting plate 18 of an injection screw 5 with bolts 19. The screw sleeve 17 penetrates a through hole in the central portion of the pusher plate 14, and is attached to the pusher plate 14 with angular bearings 15 and 16 so as to be rotatable with respect to the pusher plate 14 but immovable in the axial direction.

One bearing, 15, of the angular bearings 15 and 16 has an inner ring and an outer ring which supports a force acting on the inner ring from the front, while the other bearing, 16, has an inner ring and an outer ring which supports a force that acts on the inner ring from behind.

The respective outer rings of the bearings 15 and 16 are fixed integrally to the inner periphery of the through hole in the central portion of the pusher plate 14 by means of a ring-shaped mounting flange 22 for jointly tightening the outer rings in the injection-axis direction and bolts 23 for fixing the mounting flange 22 to the pusher plate 14. On the other hand, the respective inner rings of the bearings 15 and 16 are jointly tightened in the injection-axis direction by means of a ring-shaped fixing member 24, which mates with a male screw formed by threading the rear end portion of the outer periphery of the screw sleeve 17, and are fixed integrally to the outer periphery of the screw sleeve 17.

A pulley 20 for screw rotation is fixed integrally to the front end face of the screw sleeve 17 by means of bolts 21.

On the other hand, the tip portion of a ball screw 28 is formed into a constriction, part of which is formed with splines, and a pulley 30 for injection is engaged with the constriction through the spline. The constriction of the ball screw 28 is fitted in the internal space of the screw sleeve 17, and is supported in the screw sleeve 17 by means of angular bearings in 26 and 27 so as to be rotatable with respect to the screw sleeve 17 but immovable in the axial direction.

One bearing, 26, of these angular bearings 26 and 27 includes an inner ring and an outer ring which supports a force acting on the inner ring from forward, while the other bearing, 27, has an inner ring and an outer ring which supports a force acting on the inner ring from behind. The respective outer rings of the bearings 26 and 27 are fixed to the inner periphery of the screw sleeve 17 by means of a ring-shaped fixing member 25, which mates with a female screw formed by threading the rear end portion of the inner periphery of the screw sleeve 17. Meanwhile, the respective inner rings of the bearings 26 and 27 are jointly tightened in the injection-axis direction and fixed to the tip portion of constriction of the ball screw 28 by means of a ring-shaped fixing member 29, which mates with a male screw formed by threading the outer peripheral portion of the tip of the constricted ball screw 28, and the pulley 30 for injection.

On the other hand, the rear plate 3 is formed with a through hole in the central portion thereof, which has an inside diameter large enough to allow a ball nut 31 freely to pass through it. A ring-shaped load cell 33 is fixed coaxially with the through hole, with bolts 32, to the other surface of the rear plate 3, opposite to that surface which faces the front plate. The ball nut 31, which is fitted in the through hole of the rear plate 3, is fixed to the load cell 33 by means of bolts 34. The load cell 33, which is used as a force sensor, is deflected by a force that acts on the ball nut 31 in the injection-axis direction, and its deflection is converted into a voltage or the like.

The force acting on the ball nut 31 is the sum of a resin reaction force that acts on the injection screw 5 and sliding resistances that act between the guide rods 4 and the pusher plate 14, and it is transmitted through the ball screw 28. Then, the resin reaction force is obtained by deducting the sliding resistances from the output of the load cell 33, and is delivered to a control device of an injection molding machine.

A motor 35 for screw rotation (metering) and a motor (servomotor) 36 for injection are fixed individually to the opposite ends of the pusher plate 14, in positions symmetrical with respect to the injection axis (axis of the injection screw 5 being in line with the axis of the ball screw 28), whereby the pusher plate 14 is balanced. The motors 35 and 36 cause timing belts 39 and 40, which are passed around their respective driving pulleys 37 and 38, respectively, to drive the pulleys 20 and 30 for rotation.

In a metering/kneading process, the motor for screw rotation is driven with the motor 36 for injection kept unrotated. Thereupon, only the injection screw 5 rotates with the ball screw 28 remains unrotated. As the injection screw 5 rotates, a molten resin is fed into the distal end of an injection cilinder 2. The pressure of the molten resin is transmitted through the injection screw 5 and the pusher plate 14, and constitutes a force to press the ball screw 28 in the retreating direction. This pressure is detected by the load cell 33 through the medium of the ball nut 31. When the detected pressure exceeds a preset back pressure, the motor 36 for injection is rotated for a predetermined amount in the direction to retreat the injection screw 5, and the resulting rotational position is maintained. When the motor 36 for injection rotates, the ball screw 28 is rotated by means of the pulley 38, timing belt 40, and pulley 30, whereupon the position of engagement of the ball screw 28 with the ball nut 31 in the injection-axis direction changes, and the ball screw 28, pusher plate 14, and injection screw 5 are retreated for a predetermined distance.

When the injection screw 5 is retreated, the capacity at the front portion of the injection cylinder 2 that can store the molten resin increases so as to lower the pressure of the molten resin, so that the force to retreat the injection screw 5 and the like, that is, the resin reaction force, becomes smaller. When the rotation of the injection screw 5 by means of the motor 35 for screw rotation is further continued, more molten resin collects in the front portion of the injection cylinder 2, so that the molten resin pressure increases. Thus, the force to retreat the injection screw 5 and the like increases, as mentioned before, whereupon the aforesaid operation is carried out.

In an injection process, on the other hand, the motor 36 for injection is driven while the motor 35 for screw rotation is kept unrotated. Thereupon, only the ball screw 28 rotates with the injection screw 5 kept unrotated. When the ball screw 28 rotates, the position of engagement of the ball screw 28 with the ball nut 31, which is fixed to the rear plate 3, in the injection-axis direction changes. This change of position of the ball nut 31 causes an advancing motion of the pusher plate 14. As a result, the injection screw 5 advances in the injection cylinder 2, thereby effecting injection. A reaction force (injection pressure) the injection screw 5 then receives from the resin is transmitted to the load cell 33 through the pusher plate 14, ball screw 28, and ball nut 31.

As this is done, some frictional resistance in the circumferential direction (rotating direction) acts on the respective mating surfaces of the rotating ball screw 28 and the ball nut 31, which is fixed to the rear plate 3, so that a reaction force corresponding to the frictional resistance, as an external force or turning moment around the axis, acts on the ball screw 28 itself. Since the tip of the ball screw 28 is rotatably attached to the pusher plate 14 by means of the bearings 26 and 27 and the like, however, the turning moment will not be transmitted to the pusher plate 14 itself. Accordingly, the bushings 7 attached to the pusher plate 14 can be prevented from being one-sidedly pressed against the guide rods 4 by the turning moment around the injection axis. Thus, the sliding resistances between the guide rods 4 and the pusher plate 14 can always be kept at a fixed value regardless of the level of the circumferential frictional resistance to act on the mating surfaces of the ball screw 28 and the ball nut 31.

As described above, the load cell 33 detects the sum of the resin reaction force, which acts on the injection screw 5, and the sliding resistances, which act between the guide rods 4 and the pusher plate 14. According to the present embodiment, the sliding resistances acting between the guide rods 4 and the pusher plate 14 are kept substantially at a fixed value throughout the whole molding process including metering and injection, so that the substantial resin reaction force can be measured with ease. In measuring the injection pressure only, for example, it is necessary only that zero correction for the load cell 33 be made mechanically by subtracting a force equivalent to the sliding resistances. In measuring the injection pressure and back pressure, it is necessary only that the substantial injection pressure be obtained, in the case of injection, by subtracting the force equivalent to the sliding resistances from the detected value, and that the substantial back pressure be obtained, in the case of metering (with the screw retreated), by adding the force equivalent to the sliding resistances to the detected value.

According to this first embodiment, the tip (constriction) of the ball screw 28 is designed to penetrate the screw sleeve 17, so that the overall length of the injection mechanism can be shortened.

Figure 2:
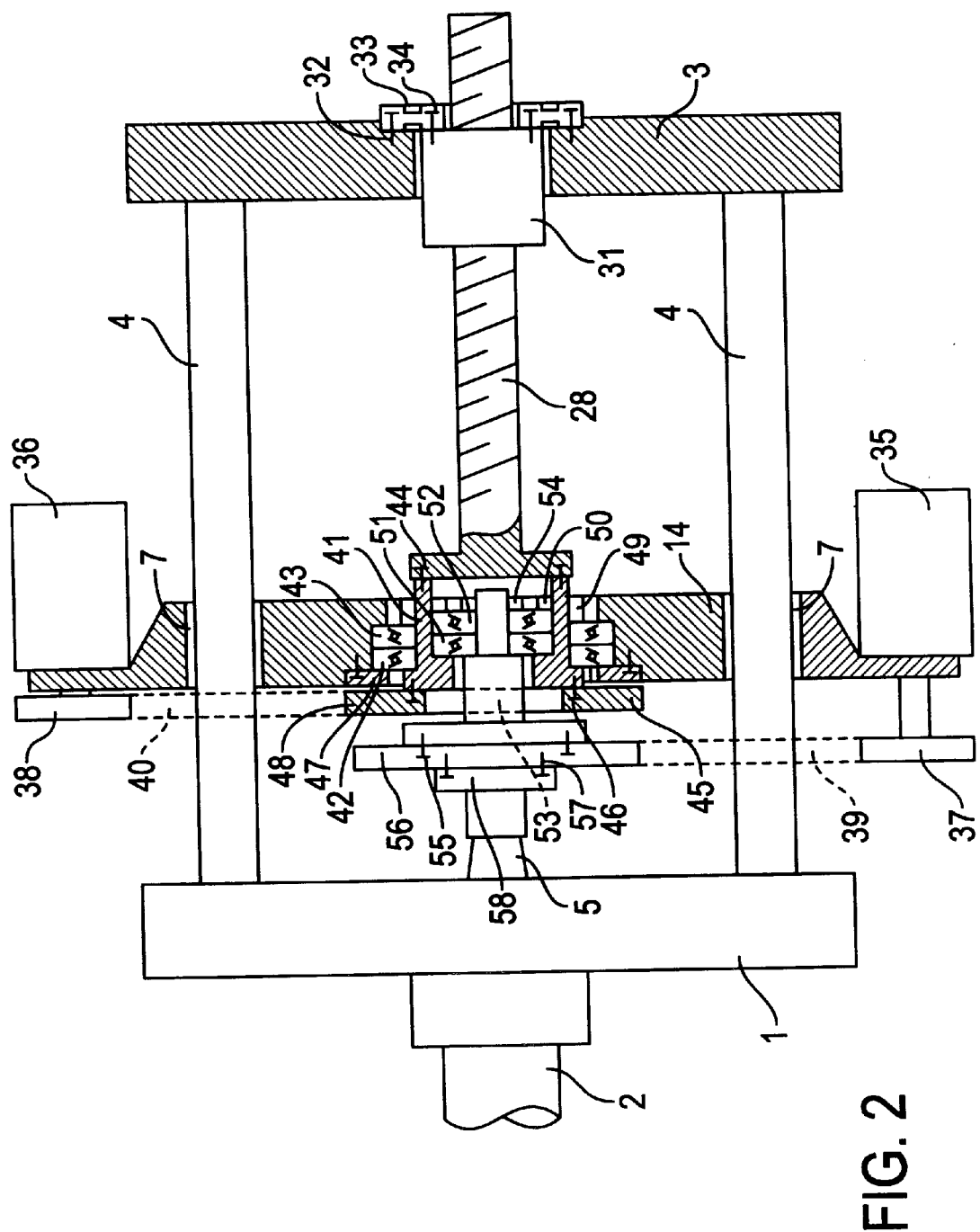
FIG. 2 is a side view, partially in section, showing an outline of a second embodiment of the injection mechanism of the injection molding machine according to the present invention.

Referring now to FIG. 2, a second embodiment of the present invention will be described. In this embodiment, a front plate 1, injection cylinder 2, rear plate 3, guide rods 4, pusher plate 14, ball nut 31, load cell 33, etc. are arranged in the same manner as those of the first embodiment shown in FIG. 1.

A ball screw sleeve 41, which is fixed to the tip of the ball screw 28 by means of bolts 44, is situated in a through hole in the central portion of the pusher plate 14, and is attached to the pusher plate 14 by means of angular bearings 42 and 43 so as to be rotatable with respect to the pusher plate 14 and immovable in the axial direction. The one 42 of these angular bearings includes an inner ring and an outer ring for supporting a force that acts on the inner ring from forward, while the other 43 includes an inner ring and an outer ring for supporting a force that acts on the inner ring from behind.

The respective outer rings of the bearings 42 and 43 are jointly tightened in the injection-axis direction by means of a ring-shaped mounting flange 47, which is attached to the pusher plate 14 by means of bolts 48, whereby they are fixed to the inner periphery of the through hole in the central portion of the pusher plate 14. Meanwhile, the respective inner rings of the bearings 42 and 43 are jointly tightened in the injection-axis direction by means, of a ring-shaped fixing member 49, which mates with a male screw formed by threading the outer periphery of the central portion of the ball screw sleeve 41, whereby they are fixed to the outer periphery of the ball screw sleeve 41.

A ring-shaped pulley 45 for injection is fixed integrally to the front end face of the ball screw sleeve 41 by means of bolts 46.

On the other hand, a pulley 56 for screw rotation is fixed to a mounting plate 58 for an injection screw 5 by means of bolts 57, while a screw sleeve 53 is fixed to the pulley 56 for screw rotation by means of bolts 55. The rear end portion of this screw sleeve 53 penetrates the internal space of the ball screw sleeve 41, and is supported in the ball screw sleeve 41 so as to be rotatable with respect to the sleeve 41 by means of angular bearings 51 and 52.

The angular bearing 51 includes an inner ring and an outer ring for supporting a force that acts on the inner ring from forward, while the angular bearing 52 includes an inner ring and an outer ring for supporting a force that acts on the inner ring from behind. The respective outer rings of these bearings 51 and 52 are fixed to the inner periphery of the ball screw sleeve 41 by means of a ring-shaped fixing member 50, which mates with a female screw formed by threading the rear end portion of the inner periphery of the ball screw sleeve 41. Meanwhile, the respective inner rings of the bearings 51 and 52 are fixed to a smaller-diameter portion of the screw sleeve 53 by means of a ring-shaped fixing member 54, which mates with a male screw formed by threading the outer peripheral portion of the distal end of the smaller-diameter portion of the screw sleeve 53.

A motor 35 for screw rotation and a motor (servomotor) 36 for injection, like the ones according to the first embodiment shown in FIG. 1, are fixed individually to the opposite ends of the pusher plate 14, in positions symmetrical with respect to the injection axis, whereby the pusher plate 14 is balanced. These motors 35 and 36 cause timing belts 39 and 40, which are passed around driving pulleys 37 and 38, respectively, to drive the pulleys 56 and 45, respectively, for rotation.

In this embodiment, as in the first embodiment, the ball screw 28 is attached to the pusher plate 14 so as to be rotatable with respect to the pusher plate 14. Accordingly, a circumferential frictional resistance that acts on the respective mating surfaces of the ball screw 28 and the ball nut 31 as the ball screw 28 is rotated never acts to cause the pusher plate 14 to generate a turning moment around the injection axis, so that sliding resistances between the guide rods 4 and the pusher plate 14 can always be kept at a fixed value. Therefore, as in the case of the foregoing first embodiment, the substantial resin reaction force can be measured accurately by means of the load cell 31.

According to this second embodiment, the ball screw sleeve 41, which is attached to the tip of the ball screw 28, is arranged so as to penetrate the pusher plate, so that the overall length of the injection mechanism can be shortened. Since the individual parts act in the same manner as in the foregoing first embodiment during the injection and metering/kneading processes, the descriptions of their actions are omitted.

Figure 3:
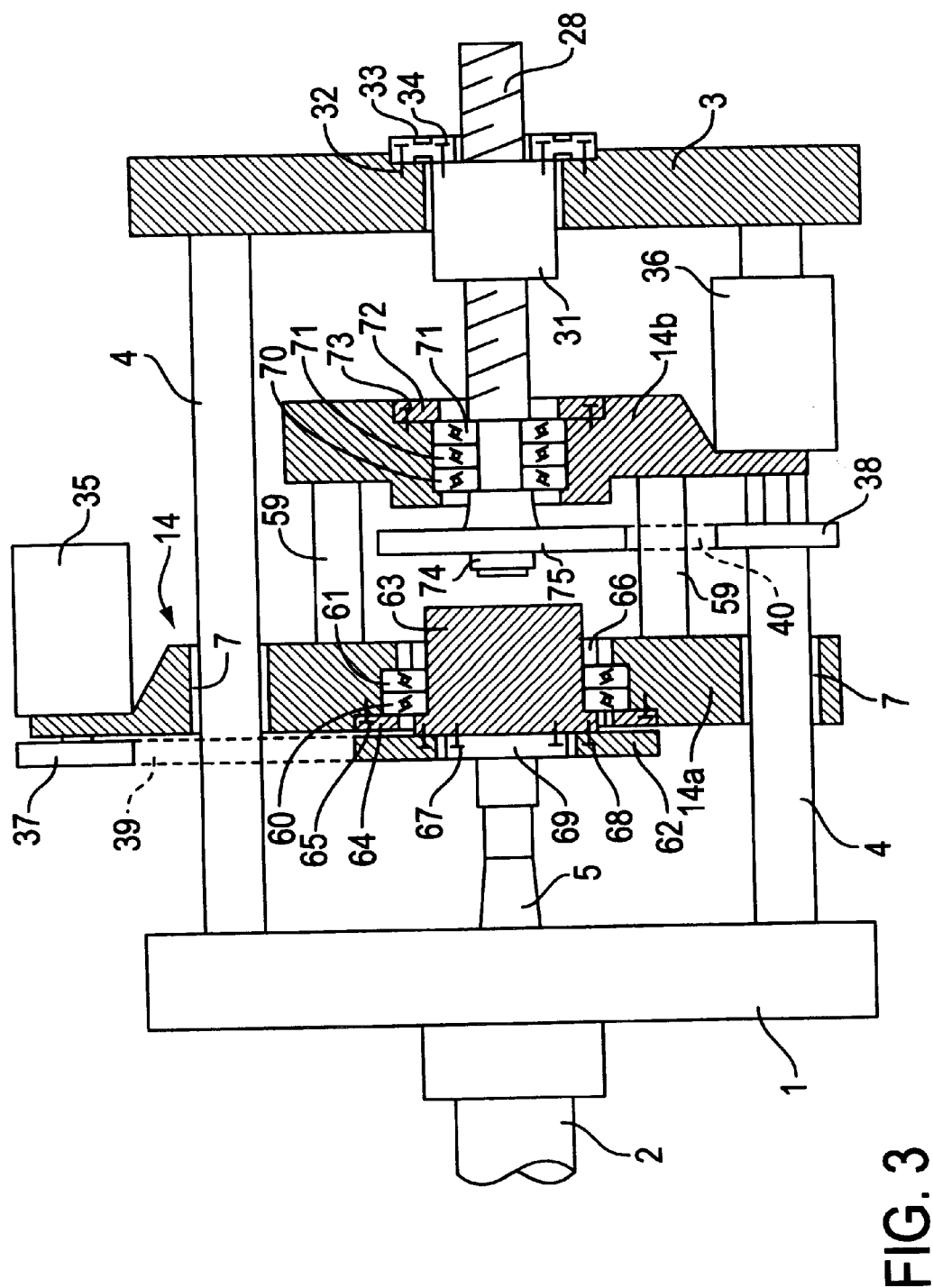
FIG. 3 is a side view, partially in section, showing an outline of a third embodiment of the injection mechanism of an injection molding machine according to the present invention.

Referring now to FIG. 3, a third embodiment of the present invention will be described. In this embodiment, front plate 1, injection cylinder 2, rear plate 3, guide rods 4, ball nut 31, load cell 33, etc. are arranged in the same manner as those of the first and second embodiments shown in FIGS. 1 and 2. In this third embodiment, however, a pusher plate 14 is divided in two, a first pusher plate (main pusher plate) 14a and a second pusher plate (auxiliary pusher plate) 14b, which are fixed individually to the opposite ends of tie rods 59 so as to face each other.

A screw sleeve 63, which is fixed to a mounting plate 69 for an injection screw 5, has its rear end portion fitted in a through hole that is formed in the center of the first pusher plate 14a and supported in the pusher plate 14a by means of angular bearings 60 and 61 so as to be rotatable with respect to the pusher plate 14a and immovable in the injection-axis direction.

The angular bearing 60 includes an inner ring and an outer ring for supporting a force that acts on the inner ring from forward, while the angular bearing 61 includes an inner ring and an outer ring for supporting a force that acts on the inner ring from behind. The respective outer rings of these bearings 60 and 61 are fixed integrally to the inner periphery of the through hole in the central portion of the first pusher plate 14a by means of a ring-shaped mounting flange 64 for joint tightening, which is attached to the first pusher plate 14a by means of bolts 65. Meanwhile, the respective inner rings of the bearings 60 and 61 are jointly tightened in the injection-axis direction by means of a ring-shaped fixing member 66, which mates with a male screw formed by threading the rear end portion of the outer periphery of the screw sleeve 63, whereby they are fixed integrally to the outer periphery of the screw sleeve 63.

A ring-shaped pulley 62 for injection screw rotation is fixed to the front end face of the screw sleeve 63 by means of bolts 68. A motor 35 for screw rotation is fixed in one spot on the outer periphery of the first pusher plate 14a, and the rotation of the motor 35 for screw rotation is transmitted to the pulley 62 by means of a pulley 37 and a timing belt 39, thereby causing the injection screw 5 to rotate.

On the other hand, a ball screw 28 has its tip in the form of a constriction penetrates a through hole in the central portion of the second pusher plate 14b, and is supported by means of three angular bearings 70 and 71, 71 so as to be rotatable with respect to the second pusher plate 14b and immovable in the axial direction.

Of these angular bearing, the angular bearings 70 includes an inner ring and an outer ring for supporting a force that acts on the inner ring from forward, while each of the two other angular bearings 71, 71 includes an inner ring and an outer ring for supporting a force that acts on the inner ring from behind. The respective outer rings of these bearings 70 and 71, 71 are fixed to the inner periphery of the through hole in the central portion of the second pusher plate 14b by means of a ring-shaped mounting flange 72 for joint tightening, which is fixed to the second pusher plate 14b by means of bolts 73. Meanwhile, the respective inner rings of the bearings 70 and 71, 71 are jointly tightened with a pulley 75 for injection, which is in spline-engagement with the constriction at the tip of the ball screw 28, and are fixed to the outer periphery of the constriction at the tip of the ball screw 28. This pulley 75 for injection is fixed at a predetermined position in the axial direction of the ball screw 28 by means of a nut 74, which mates with a male screw formed by threading the distal end portion of the constriction at the tip of the ball screw 28.

The axis of the ball screw 28, like the ones according to the foregoing first and second embodiments, is in line with the axis (injection axis) of the injection screw 5.

A motor (servomotor) 36 for injection is fixed at one spot on the outer periphery of the second pusher plate 14b, and serves to rotate the pulley 75 through the pulley 38 and a timing belt 40.

The second pusher plate 14b may be made greater in diameter than the one shown in FIG. 3, and, like the first pusher plate 14a, it may be slidably mounted on the guide rods 4.

In this third embodiment, as in the first and second embodiments, the ball screw 28 is mounted for rotation with respect to the pusher plate 14 (second pusher plate 14b), and so a circumferential frictional resistance that acts on the respective mating surfaces of the ball screw 28 and the ball nut 31 as the ball screw 28 is rotated will never act as a turning moment around the injection axis on the pusher plate 14 (second pusher plate 14b and first pusher plate 14a). Thus, sliding resistances between the guide rods 4 and the pusher plate 14 (first pusher plate 14a) can be kept substantially at a fixed value in the whole molding process including metering and injection. Thus, as in the cases of the foregoing embodiments, the substantial resin reaction force can be measured accurately by means of the load cell 33.

In this third embodiment, moreover, the pulley 75 for injection is mounted on the tip portion of the ball screw 28 that projects forward from the second pusher plate 14b, so that the pulley 75 can easily be replaced by only removing the nut 74. Accordingly, this arrangement is useful in the case where the reduction ratio of a drive system for the ball screw 28 has to be changed by replacing the pulley 75.

Since the operations for the injection and metering/kneading processes are performed in the same manner as in the embodiments shown in FIGS. 1 and 2, a description of those operations is omitted.

Figure 4:
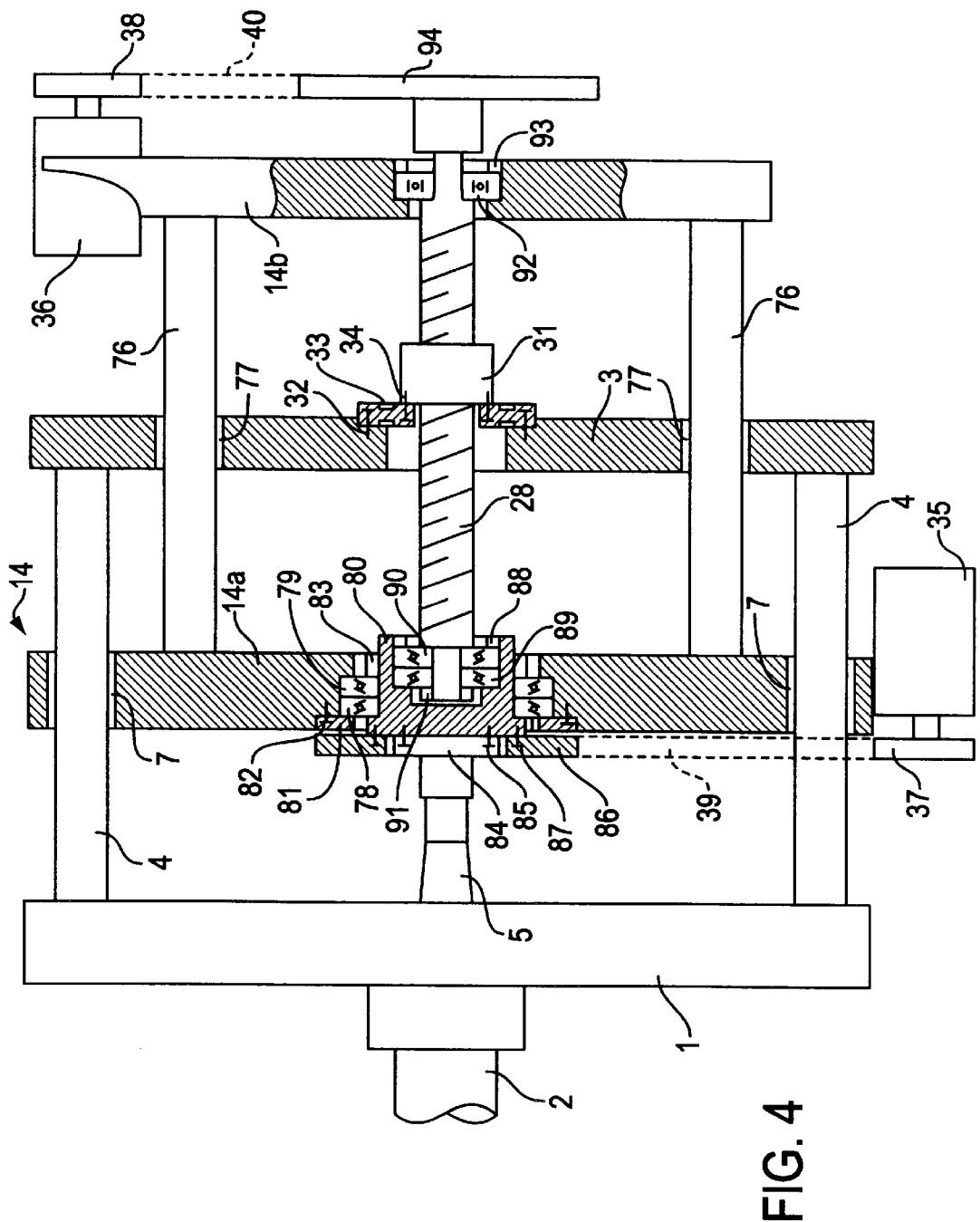
FIG. 4 is a side view, partially in section, showing an outline of a fourth embodiment of the injection mechanism of an injection molding machine according to the present invention.
Figure 5:
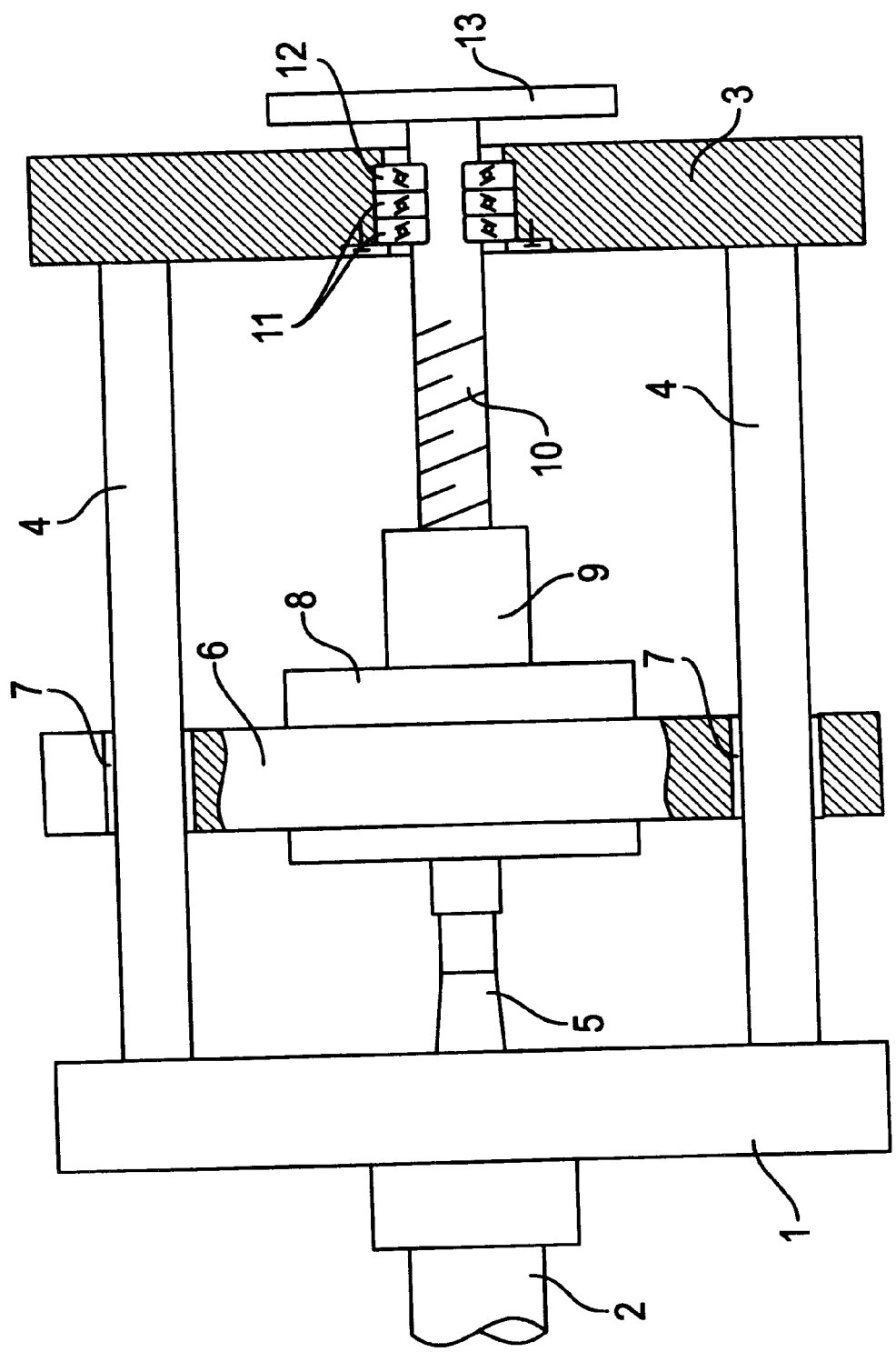
FIG. 5 is a side view, partially in section, showing an outline of a prior art example of an injection mechanism of an injection molding machine.
Figure 6:
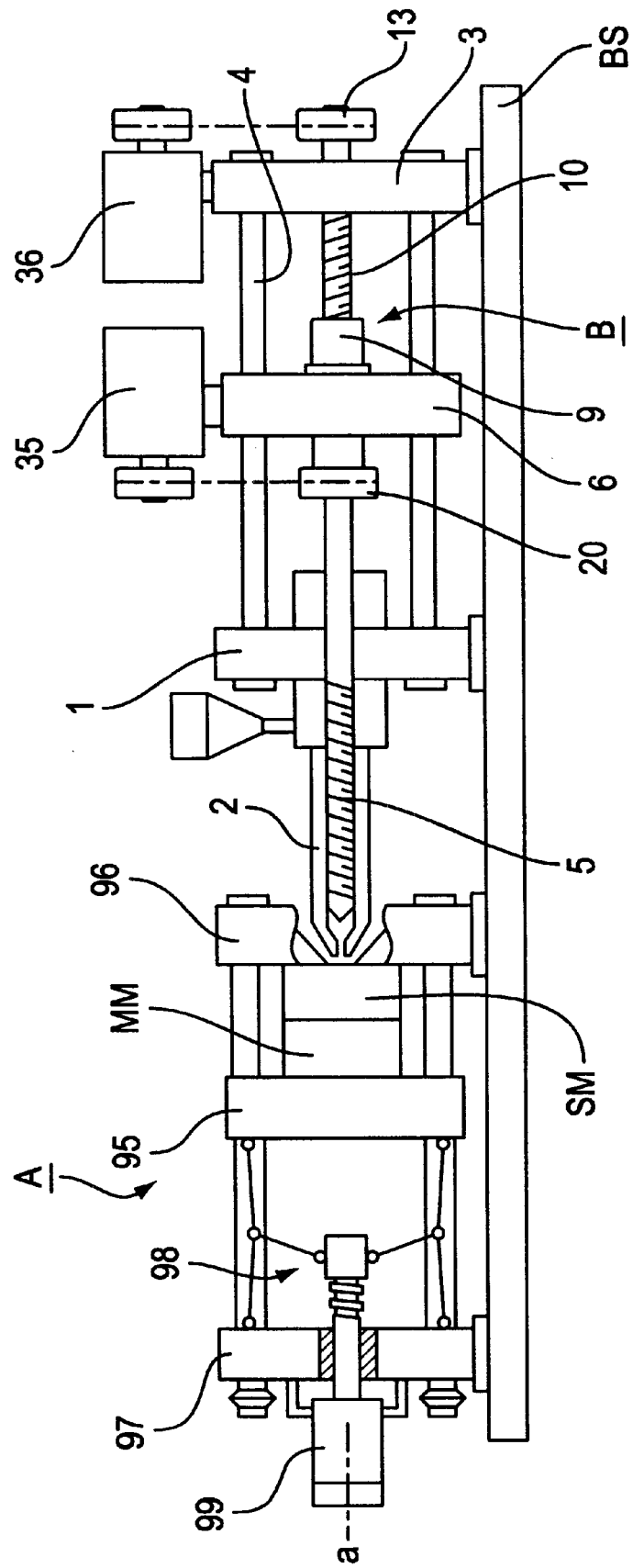
FIG. 6 is a side view showing an outline of the prior art injection molding machine.

Referring now to FIG. 4, a fourth embodiment of the present invention will be described. A pusher plate 14 according to this fourth embodiment is divided in two, a first pusher plate (main pusher plate) 14*a* and a second pusher plate (auxiliary pusher plate) 14*b*, which are fixed individually to the opposite ends of tie rods 76 so as to face each other with a rear plate 3 disposed between them. Thus, the rear plate 3 is provided with through holes through which the tie rods 76 are passed, and bushings 77 for slidably supporting the tie rods 76 are fixed individually to the respective inner peripheries of the through holes.

A screw sleeve 80 is fixed to a screw mounting plate 84 for an injection screw 5 by means of bolts 85. This screw sleeve 80 penetrates the inner periphery of a through hole in the central portion of the pusher plate 14*a*, and is attached to the pusher plate 14*a* by means of angular bearings 78 and 79 so as to be rotatable with respect to the pusher plate 14*a* and immovable in the axial direction.

Since this arrangement, in which the screw sleeve 80 is attached to the pusher plate 14*a* by means of the angular bearings 78 and 79 so as to be rotatable with respect to the pusher plate 14*a* and immovable in the axial direction is identical with the arrangement according to the first embodiment shown in FIG. 1, in which the screw sleeve 17 is attached to the pusher plate 14 by means of the angular bearings 15 and 16 so as to be rotatable with respect to the pusher plate 14 and immovable in the axial direction, a detailed description of the aforesaid arrangement is omitted. A mounting flange 81, bolts 82, and ring-shaped fixing member 83 in FIG. 4, showing this fourth embodiment, correspond to the mounting flange 22, bolts 23, and ring-shaped fixing member 24, respectively, in FIG. 1 showing the first embodiment.

A pulley 86 for screw rotation is fixed to the front end face of the screw sleeve 80 by means of bolts 87. A motor 35 for screw rotation is fixedly mounted at one spot on the outer peripheral edge of the first pusher plate 14*a*, and serves to rotate the pulley 86 with the aid of a driving pulley 37 and a timing belt 39.

On the other hand, the tip of a ball screw 28, which is in the form of a constriction, is fitted in the internal space of the screw sleeve 80, and is supported in the screw sleeve 80 by means of angular bearings 89 and 90 so as to be rotatable with respect to the screw sleeve 80 and immovable in the axial direction. Since this arrangement, in which the tip-end constriction of the ball screw 28 is supported in the screw sleeve 17 by means of the angular bearings 89 and 90, is identical with arrangement according to the first embodiment shown in FIG. 1, in which the tip-end constriction of the ball screw 28 is supported in the screw sleeve 17 by means of the angular bearings 26 and 27, a detailed description of the aforesaid arrangement is omitted. Ring-shaped fixing members 88 and 91 in FIG. 4 correspond to the ring-shaped fixing members 24 and 25, respectively, in FIG. 1.

The ball screw 28 passes through a through hole formed in the center of the rear plate 3, and then extends rearward from the rear plate 3. A load cell 33 is fixed to the back of the rear plate 3 by means of bolts 32. A ball nut 31, which mates with the ball screw 28, is fixed to the rear face of the load cell 33 by means of bolts 34. Thus, the fourth embodiment differs from the first to third embodiments in that the ball nut 31 is fixed to the rear plate 3 through the load cell 33. More specifically, according to the present embodiment, the ball nut 31 is fixed to the end face of the load cell 33 which is opposite to the side of the injection screw 5. This is done because if the ball nut 31 is located on the side of the rear plate 3 facing to the injection screw 5, its projection inevitably makes the sliding stroke of the pusher plate 14 (first pusher plate 14*a* and second pusher plate 14*b*) shorter, and this has to be avoided.

The rear end of the ball screw 28, which extends further rearward from the rear plate 3, penetrates a through hole in the central portion of the second pusher plate 14*b*. The rear end portion of the ball screw 28, which is situated in the through hole in the second pusher plate 14*b*, is in the form of a constriction, and is supported in the second pusher plate 14*b* by means of a radial bearing 92.

The outer ring of the radial bearing 92 is fixed to the second pusher plate 14*b* by means of a ring-shaped fixing member 93, which mates with a female screw formed by threading the rear end portion of the inner periphery of the aforesaid through hole. Meanwhile, the inner ring of the bearing 92 is fixed to the constriction of the ball screw 28.

A pulley 94 for injection is fixed to the rearmost end portion of the ball screw 28. A motor (servomotor) 36 for injection, which is fixed at one spot on the outer periphery of the second pusher plate 14*b*, serves to rotate the pulley 94 through a driving pulley 38 and a timing belt 40.

Arranged as described in the foregoing, if only the motor 36 for injection is rotated, only the ball screw 28 rotates independently of the injection screw 5. Consequently, the position of engagement of the ball screw 28 with the ball nut 31, which is fixed to the rear plate 3, in the injection-axis direction changes, whereby the ball screw 28, the first pusher plate 14*a*, which is fitted with the ball screw 28 so as to be immovable in the injection-axis direction, and the second pusher plate 14*b* integral therewith are made to advance or retreat. That is, the injection screw 5 is made to move in an injection cylinder 2.

According to this fourth embodiment, as in the first to third embodiments, the ball screw 28 is mounted for rotation with respect to the pusher plate 14 (first pusher plate 14*a* and second pusher plate 14*b*). Accordingly, a circumferential frictional resistance, that acts on the respective mating surfaces of the ball screw 28 and the ball nut 31 as the ball screw 28 is rotated, will never act as a turning moment around the injection axis on the pusher plate 14 (first pusher plate 14*a* and second pusher plate 14*b* and first pusher plate 14*a*). Thus, sliding resistances between the guide rods 4 and the first pusher plate 14*a* and between the tie rods 76 and the bushings 77 in the rear plate 3 can always be kept at a fixed value during the molding process. As in the cases of the first to third embodiments, therefore, the substantial resin reaction force can be measured accurately by means of the load cell 31.

In this fourth embodiment, the pulley 94 for injection is mounted on the rear end portion of the ball screw 28 that projects from the back of the second pusher plate 14*b*, which is situated in the rearmost position in the injection mechanism, so that the pulley 94 can easily be replaced in the same manner as in the third embodiment shown in FIG. 3. Thus, this arrangement can conveniently be used in the case where the reduction ratio of a drive system for the ball screw 28 has to be changed by replacing the pulley 94.

Since the operations for the injection and metering/kneading processes according to this embodiment are performed in the same manner as in the foregoing embodiments, descriptions of those operations are omitted.

We claim:

1. An injection mechanism of an injecting molding machine, which comprises:

an assembly including a front plate, a rear plate, and a pusher plate, wherein the front plate is connected to the rear plate, the pusher plate is guided in the direction of an injection axis to be movable between the front and rear plates, and the pusher plate supports a rear end portion of an injection screw so as to be rotatable with respect to the pusher plate and the pusher plate engages with the tip of a screw;

a load cell fixed to part of a member, which forms said assembly;

a nut fixed to said load cell and mating with the screw;

a first drive source and first rotation transmitting means for rotating said injection screw; and a second drive source and second rotation transmitting means for rotating said screw to move the screw in the axial direction with respect to the ball nut;

wherein:

engagement of said screw with the pusher plate is based on an arrangement such that the screw engages said pusher plate so as to be rotatable with respect to said pusher plate, and the load cell is fixed to the rear plate, which forms the assembly, so that the nut is fixed to the rear plate through the load cell.

2. An injection mechanism of an injection molding machine according to claim 1, wherein said force sensor is fixed to the rear plate constituting said assembly, whereby said ball nut is fixed to the rear plate through the force sensor.

3. An injection mechanism of an injection molding machine according to claim 2, wherein said force sensor is ring-shaped, and the ball screw in engagement with said ball nut is movable in the axial direction thereof through a center space of the force sensor.

4. An injection mechanism of an injection molding machine according to claim 1, wherein a rear end portion of said injection screw is supported on the pusher plate so as to be rotatable with respect to said pusher plate in a manner such that a screw sleeve attached to the rear end portion of the injection screw is inserted in a through hole formed in the center of the pusher plate, the inserted screw sleeve is supported on the pusher plate so as to be rotatable with respect to said pusher plate; and engagement of the ball screw with said pusher plate is based on an arrangement such that a tip of the ball screw is inserted in an internal space of said screw sleeve inserted in the center through hole of the pusher plate, the inserted ball screw being supported in the screw sleeve so as to be rotatable with respect to said screw sleeve and immovable in the axial direction.

5. An injection mechanism of an injection molding machine according to claim 4, wherein a pulley for injection screw rotation is formed or fixed between the rear end portion of said injection screw and said screw sleeve.

6. An injection mechanism of an injection molding machine according to claim 5, wherein a motor for rotating said pulley for injection screw rotation is fixed in one spot on an outer periphery of the pusher plate, a pulley for ball screw rotation is mounted on said ball screw so as to be rotatable integrally and a motor for rotating a pulley for injection screw rotation, mounted on the injection screw so as to be rotatable integrally therewith, is fixed in a position on the outer periphery of the pusher plate which is substantially symmetrical with a spot with respect to a common axis for said injection screw and the ball screw.

7. An injection mechanism of an injection molding machine according to claim 1, wherein engagement of the ball screw with said pusher plate is based on an arrangement such that a ball screw sleeve attached to a tip of the ball screw is inserted in a through hole formed in the center of the pusher plate, the inserted ball screw sleeve is supported on the pusher plate so as to be rotatable with respect to said pusher plate and immovable in an axial direction; and a rear end portion of said injection screw is supported on the pusher plate so as to be rotatable with respect to said pusher plate in a manner such that the rear end portion of the injection screw or an extension member attached to the rear end portion of the injection screw is inserted in an internal space of said ball screw sleeve, the inserted rear end portion or extension portion of the injection screw being supported in the ball screw sleeve so as to be rotatable with respect to said rear end portion or extension portion.

8. An injection mechanism of an injection molding machine according to claim 7, wherein said ball screw sleeve is fixedly fitted with a pulley for ball screw rotation.

9. An injection mechanism of an injection molding machine according to claim 8, wherein a motor for rotating said pulley for ball screw rotation is fixed in one spot on the outer periphery of the pusher plate, and a motor for rotating a pulley for injection screw rotation, mounted on the injection screw so as to be rotatable integrally therewith, is fixed in a position on the outer periphery of the pusher plate which is substantially symmetrical with a spot with respect to a common axis for said injection screw and the ball screw.

10. An injection mechanism of an injection molding machine according to claim 1, wherein said pusher plate includes a main pusher plate and an auxiliary pusher plate mounted integrally on the side of said main pusher plate which is opposite to a side of the injection screw by a connecting means, said main and auxiliary pusher plates being always kept so as to face each other across a predetermined space;

a rear end portion of said injection screw is supported on the main pusher plate so as to be rotatable with respect to said main pusher plate in a manner such that a mounting member attached to the rear end of the injection screw is inserted in a through hole formed in the center of the main pusher plate, the inserted mounting member being supported on the main pusher plate so as to be rotatable with respect to said main pusher plate; and the engagement of the ball screw with said main pusher plate is based on an arrangement such that the tip portion of the ball screw is inserted in a through hole formed in the center of the main pusher plate, the inserted mounting member being supported on the main pusher plate so as to be rotatable with respect to said main pusher plate; and engagement of the ball screw with said main pusher plate is based on an arrangement such that the tip portion of the ball screw is inserted in a through hole formed in the center of said auxiliary pusher plate, the inserted ball screw being supported in the auxiliary screw sleeve so as to be rotatable with respect to said auxiliary screw sleeve and immovable in the axial direction.

11. An injection mechanism of an injection molding machine according to claim 10, wherein said auxiliary pusher plate is penetrated by guide rods, which connect the front plate and the rear plate, the guide rods being slidable together with the main pusher plate.

12. An injection mechanism of an injection molding machine according to claim 11, wherein a tip portion of said ball screw penetrates the auxiliary pusher plate to be situated between the main pusher plate and the auxiliary pusher plate, the penetrating tip portion of the ball screw being fitted with a pulley which is for rotation of said ball screw.

13. An injection mechanism of an injection molding machine comprising:

an assembly including a plurality of parallel guide rods, a front plate and a rear plate fixed individually to the opposite ends of each of these guide rods, and a pusher plate movable between said front and rear plates by being guided with said guide rods, the pusher plate supporting the rear end portion of an injection screw so as to be rotatable with respect to the pusher plate and engaging with the tip of a ball screw;

a force sensor fixed to said rear plate;

a ball nut fixed to said force sensor and mating with the ball screw;

a first drive source and first rotation transmitting means for rotating said injection screw; and a second drive source and second rotation transmitting means for rotating said ball screw to move the ball screw in the axial direction with respect to the ball nut;

an injection mechanism of an injection molding machine, and wherein:

engagement of said ball screw with the pusher plate is based on an arrangement such that the ball screw engages said pusher plate so as to be rotatable with respect to said pusher plate and immovable in an axial direction, wherein said pusher plate includes a main pusher plate and an auxiliary pusher plate mounted integrally on a side of said main pusher plate, said main and auxiliary pusher plates being always kept so as to face each other across the rear plate and a predetermined space;

a rear end portion of said injection screw is supported on the main pusher plate so as to be rotatable with respect to said main pusher plate such that a screw sleeve attached to the rear end portion of the injection screw is inserted in a through hole formed in the center of the pusher plate, the inserted screw sleeve being supported on the main pusher plate so as to be rotatable with respect to said main pusher plate;

engagement of said ball screw with said main pusher plate is based on an arrangement such that a tip of the ball screw is inserted in an internal space of said screw sleeve, which is inserted in a center through hole of the main pusher plate, the inserted ball screw being supported in the screw sleeve so as to be rotatable with respect to said screw sleeve and immovable in the axial direction; and the rear end of said ball screw is rotatably supported by support means attached to said auxiliary pusher plate.

14. An injection mechanism of an injection molding machine according to claim 13, wherein said ball nut mating with said ball screw is attached to a side face of the rear plate which is opposite to a side of the injection screw, that is, the side face on the auxiliary pusher plate side, through a load cell.

15. An injection mechanism of an injection molding machine according to claim 14, wherein the rear end portion of said ball screw projects further rearward from said auxiliary pusher plate, the projecting rear end portion of the ball screw being fitted with a pulley for ball screw rotation.

* * * * *